Jan. 6, 1931.  C. HERMAN ET AL  1,788,237
HEDGE TRIMMING MACHINE
Filed Sept. 13, 1929  2 Sheets-Sheet 2
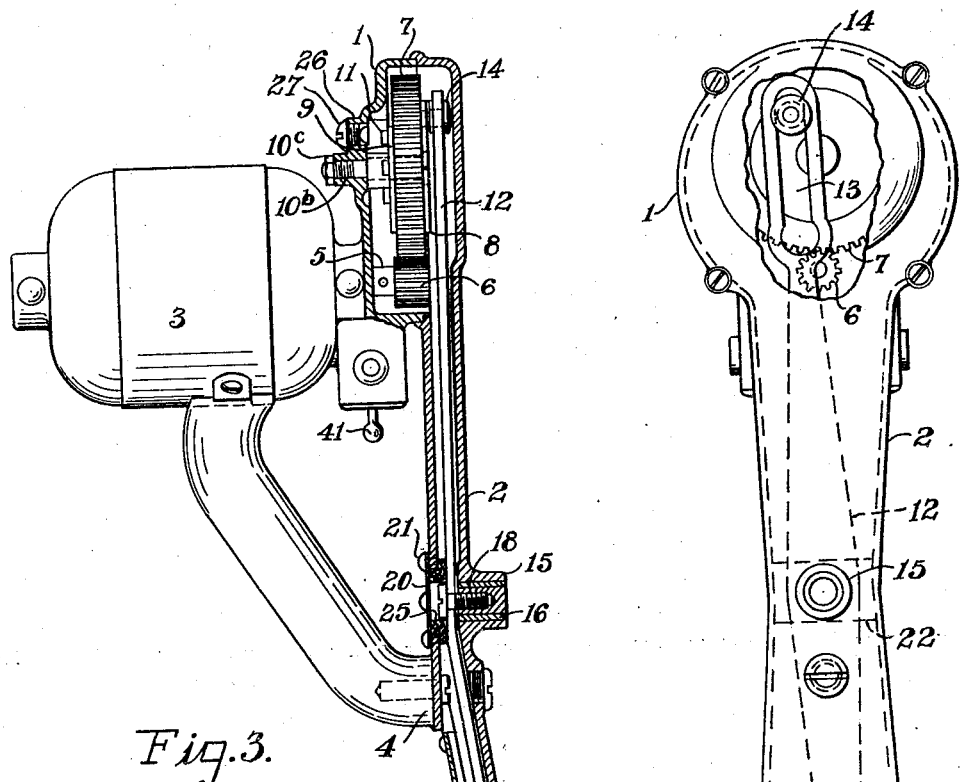
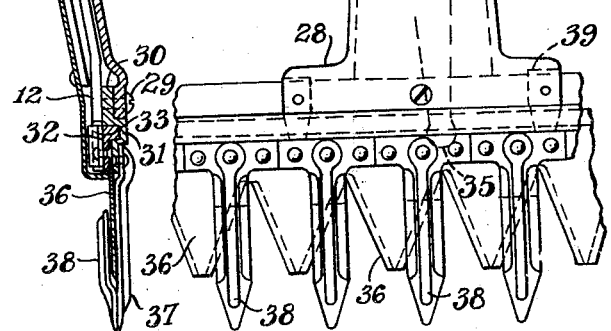
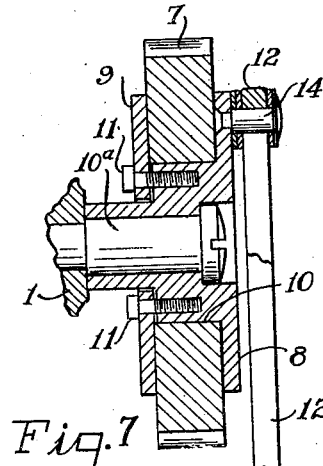
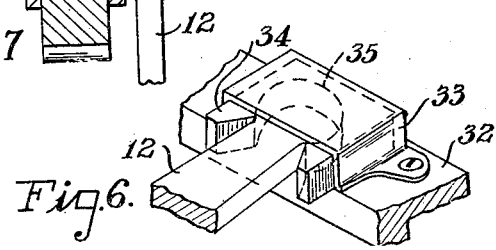
INVENTORS,
Christian Herman and
BY Elmer H. Brudenbaugh,
Howard S. Smith,
Their ATTORNEY Patented Jan. 6, 1931

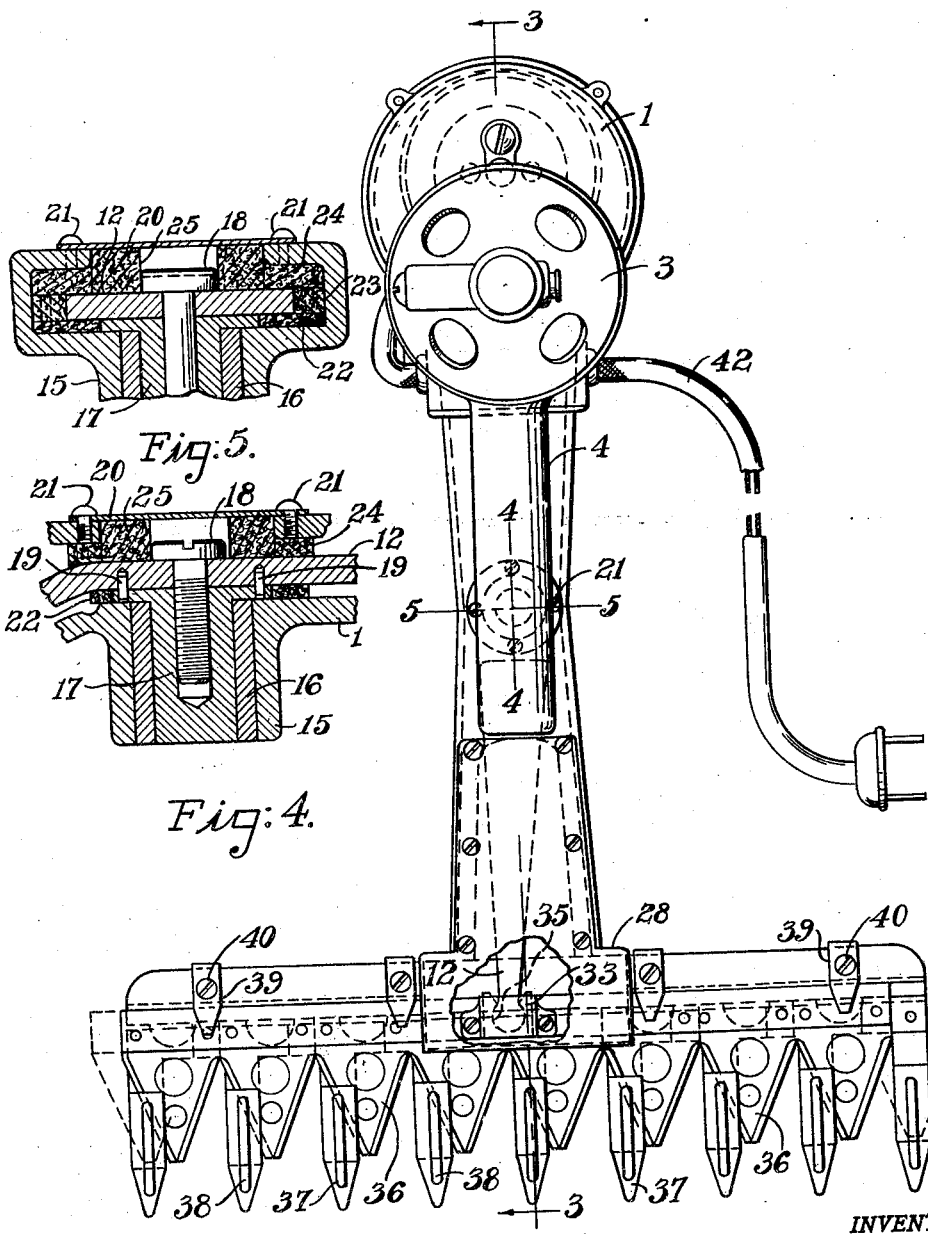

1,788,237

UNITED STATES PATENT OFFICE

CHRISTIAN HERMAN, OF WEST MILTON, AND ELMER H. BRIDENBAUGH, OF DAYTON, OHIO; SAID BRIDENBAUGH ASSIGNOR TO SAID HERMAN

HEDGE-TRIMMING MACHINE

Application filed September 13, 1929. Serial No. 392,310.

This invention relates to new and useful improvements in hedge trimming machines.

It is one of the principal objects of our invention to provide a simple, compact and light motor-driven machine for trimming ornamental hedges or lawns.

It is another object of our invention to provide the machine with a friction drive whereby when the trimmers stall on dead wood, thick vines or other tough foliage, the motor will slow down until the operator has a chance to turn off the current, thus preventing the stripping of the gears.

Our hedge trimming machine is attractive in appearance, easily handled and efficiently operated.

Other important and incidental objects will be brought out in the following specification and particularly set forth in the subjoined claims.

In the accompanying drawings illustrating our invention, Figure 1 is a top plan view of our hedge trimming machine. Figure 2 is a bottom plan view thereof. Figure 3 is a longitudinal sectional view taken through the hedge trimming machine on the line 3—3 of Figure 1. Figure 4 is a longitudinal section taken through the device on the line 4—4 of Figure 1. Figure 5 is a cross sectional view taken through the trimmer on the line 5—5 of Figure 1. Figure 6 is a perspective view of the means for attaching the rocker arm to the movable shear blade, and Figure 7 is a sectional view taken through the frictional drive mechanism.

Referring to the accompanying drawings for a detailed description of our invention, the numeral 1 designates a gear housing having a forwardly projecting T-shaped rocking lever containing portion 2. Mounted upon the top portion of the gear-containing-part of the housing 1, is an electric motor 3 between which and the top portion of the casing 1 an inclined handle 4 is connected.

Projecting into the gear housing 1 from the motor 3 is an armature shaft 5 carrying on its lower end a fixed pinion 6. Meshing with the latter is a horizontal gear 7 between two friction plates 8 and 9. (See Figures 3 and 7.) The gear 7 is free to turn around a hub 10 on the lower plate 8. This hub is free to turn on a bolt $10^a$ which projects upwardly through a reduced portion of the hub, being itself reduced in diameter beyond this point for projection through a boss $10^b$ on the housing 1 and receiving on its upper end a nut $10^c$. By these means the hub is firmly secured to the housing for a turning movement around the bolt $10^a$.

The upper plate 9 is secured to the hub 10 by studs 11. The plates 8 and 9 have sufficient frictional contact with the faces of the gear 7 to be turned by it to reciprocate a rocking lever 12 for operating the trimmers, except when the latter encounter a tough object such as dead wood. In this instance the plates will slip on the gear to save its teeth from stripping.

The inner end of the rocking lever 12 is formed with an elongated slot 13 to receive a pin 14 on the lower friction plate 8. At its middle portion the rocking lever 12 is pivoted within the elongated portion 2 of the housing 1 by the following means. Projecting downwardly from the middle portion of the housing 1 is a boss 15 containing a bushing 16.

The bushing 16 receives a stud 17 having a flanged top which is secured by a screw 18 to the middle portion of the rocking lever 12. In order to prevent the stud from turning when the screw 18 is turned, there project downwardly from the lever 12 into two holes in the flange portion of the stud, two pins 19, 19. (See Figure 4.) The flange on the stud 17 projects well over the top surface of the bushing to rest upon the machined surface of the housing 1, whereby the stud may be firmly supported for the turning movement which the lever imparts to it. The stud thus becomes a solid bearing for the lever.

The stud assembly is inserted in the housing 1 through an opening in its top which is closed by a circular cover plate 20 which is secured to the housing by screws 21. (See Figures 1, 4 and 5.) After the flanged stud 17 is inserted in the bushing 16, a hard felt washer 22 to which a washer 23 of the same material is stapled, is inserted with the latter washer to form a packing between the lever 12 and the bottom and side walls of the housing 1. After the washers 22 and 23 are in place, the lever 12 is secured to the stud by the screw 18. A washer 24 is then inserted between the top of the lever 12 and the housing 1, after which a washer 25 is fitted around the head of the screw 12, both of said washers 24 and 25 being preferably constructed of hard felt. The cover plate 20 is then applied to the housing by the screws 21. The four washers 22, 23, 24 and 25 form together a laminated seal to hold in the gear portion of the housing, oil which is introduced thereto through the opening 26 closed by a screw plug 27.

The housing 1 widens as it inclines downwardly to a cross end portion 28. Secured within the latter by screws 29, and projecting beyond it at both ends, is a member 30 formed with a U-shaped portion 31 which acts as a guide for the sickle bar 32. This sickle bar is shaped in cross section to provide a heel part that is free to travel back and forth in the groove formed by the U-shaped portion 31 of the member 30.

Fixedly secured to the top of the sickle bar 32 is a U-shaped guide clip 33 which receives a sliding block 34. The latter, which is free to slide longitudinally within the clip, is formed with a curved socket portion. The lever 12, which follows in linear shape the contour of the housing 1, terminates at its outer end in a ball portion 35 that is loosely fitted in the socket portion of the block 34. Therefore, when the ball end of the lever 12 is reciprocated by the friction drive mechanism hereinbefore described, the sickle bar 32 will be given an alternating lateral movement along the fixed guide member 30.

Riveted to the under side of the sickle bar 32 is a series of blades 36 having triangular cutting portions with beveled edges. To guide and protect the blades 36, U-shaped guards or guides 37 are riveted to the under side of the fixed guide member 30. These fixed guides have pointed ends from which ribs 38 extend rearwardly over their top sides for reinforcing purposes. The side edges of these guides are also beveled between their rear portions and pointed ends to assist the blades 36 in their cutting operations. Therefore, when the blades 36 are reciprocated between the top and bottom portions of the U-shaped guides 37 by the rocking lever 12, they will be effective in trimming a hedge or a lawn in a thorough and easy manner. The sickle bar 32 is held in place during its reciprocal movement by overhanging clips 39 which are secured to the fixed guide member 30 by screws 40.

A conventional toggle switch 41 is mounted on the housing 1 below the motor 3 to control the operation of the latter. Electric current is conducted to the motor through a cable 42.

Our hedge trimming machine just described may be easily grasped by the handle 4 to direct its cutting movement over an ornamental hedge, grass, floral borders or shrubbery to cleanly and thoroughly trim them at the cost of much less time and effort than that required by the old hand shears. The handle is so located on the machine that the latter will be balanced in any position in which it is carried, thus relieving a strain on the upper wrist part of the hand that grips the handle.

Having described our invention, we claim:

1. A device of the type described including a motor, a gear housing secured to the under side of the motor and having a forwardly extending portion, a trimming mechanism carried by the front end of the latter, and operatively connected to the motor through said housing, and a handle secured to the latter between the trimming mechanism and the motor.

2. A device of the type described including a motor, a gear housing secured to the under side of the motor and having a forwardly extending portion, a trimming mechanism carried by the front end of the latter, and a handle connected at one end to the motor and inclining downwardly for connection at its other end to the middle portion of the extended portion of the gear housing.

3. A device of the type described including a motor, a gear housing secured to the motor and having a forwardly extending portion, a trimming mechanism secured to the front end of the latter, a horizontally mounted gear in said housing below the motor, an armature shaft projecting downwardly from said motor into the gear housing, a pinion on said shaft in mesh with said gear, a rocking lever within the gear housing and operatively connected at its front end to the trimming mechanism, and a friction plate mechanism in engagement with the faces of said gear to rock said lever for the purpose specified.

4. A device of the type described including a motor, a gear housing secured to the motor, and having a forwardly extending portion, a trimming mechanism secured to the front end of the latter, a gear horizontally mounted in said housing below the motor, an armature shaft projecting downwardly from said motor into the gear housing, a pinion on said shaft in mesh with said gear, a rocking lever within the gear housing and operatively connected at its front end to the trimming mechanism, a friction plate in contact with the lower face of the gear, and having a hub projecting through the latter, a plate secured to the hub and bearing against the upper face of the gear, a pivot projecting from the upper portion of the housing through the hub to rotatively support the same, the inner end of said lever formed with a longitudinal slot, and a pin on the face of said plate fitted in said slot to rock the lever when the plate is rotated by the gear.

5. A device of the type described including a motor, a gear housing secured to the motor, a rocking lever within said housing operatively secured at its inner end to the motor, a fixed cross guide member formed with a groove, secured to the outer end of the gear housing, a sickle bar having a projection slidable in said groove, blades attached to the sickle bar, U-shaped guards secured to the fixed guide member for the blades, a U-shaped clip secured to the sickle bar, the lever terminating at its outer end in a ball shaped portion, and a block slidable within said clip and formed with a curved socket portion to receive the ball end of the lever for the purpose specified.

In testimony whereof we have hereunto set our hands this 12th day of September, 1929.

CHRISTIAN HERMAN.
ELMER H. BRIDENBAUGH.